United States Patent [19]
Tohyama

[11] Patent Number: 6,055,379
[45] Date of Patent: Apr. 25, 2000

[54] FLASH DEVICE, CAMERA, AND CAMERA SYSTEM COMPOSED OF FLASH DEVICE AND CAMERA BODY

[75] Inventor: Kei Tohyama, Kawasaki, Japan

[73] Assignee: Canon Kabushiki Kaisha, Tokyo, Japan

[21] Appl. No.: 09/096,765

[22] Filed: Jun. 12, 1998

[30] Foreign Application Priority Data

Jun. 23, 1997 [JP] Japan ..................... 9-180285

[51] Int. Cl.[7] .................................................. G03B 15/03
[52] U.S. Cl. ........................... 396/161; 396/164; 396/222
[58] Field of Search ................................. 396/155, 159, 396/161, 164, 166, 222

[56] References Cited

U.S. PATENT DOCUMENTS

| | | | |
|---|---|---|---|
| 5,130,737 | 7/1992 | Azuma et al. ..................... | 396/161 |
| 5,168,300 | 12/1992 | Yasukawa ......................... | 396/164 |
| 5,708,873 | 1/1998 | Kobayashi ........................ | 396/159 |

*Primary Examiner*—Russell Adams
*Attorney, Agent, or Firm*—Robin, Blecker & Daley

[57] ABSTRACT

A flash device having a flash bracketing function includes a setting device for setting a flash bracketing operation, and a control circuit for, when a camera connected to the flash device is of a type having the flash bracketing function, outputting information on a reference value for exposure-amount correction and an amount of shift for flash bracketing, and for, when a camera connected to the flash device is of a type not having the flash bracketing function, outputting information on a currently-set exposure-amount correction value.

14 Claims, 14 Drawing Sheets

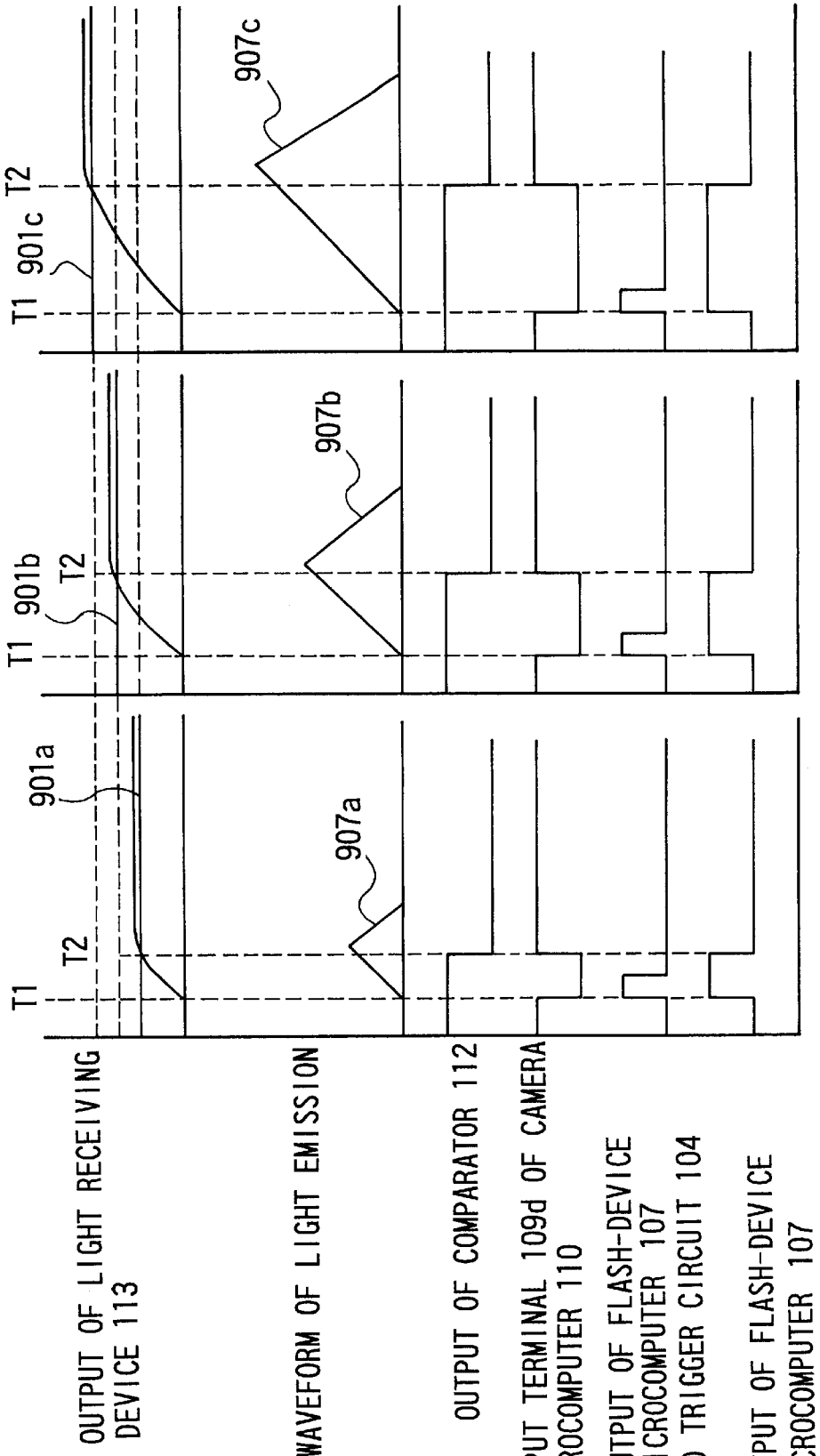

▨ BLINK    ■ LIGHT UP

FLASH DEVICE, CAMERA, AND CAMERA SYSTEM COMPOSED OF FLASH DEVICE AND CAMERA BODY

BACKGROUND OF THE INVENTION

1. Field of the Invention

The present invention relates to a flash bracketing photography in which a photograph is taken while varying the amount of light emission of a flash device for each release.

2. Description of Related Art

If a camera body having a flash bracketing function is combined with a flash device, it is possible to perform a flash bracketing photography by utilizing a TTL light-adjusting function of the camera body.

However, if a camera body not having the flash bracketing function is used for performing the flash bracketing photography, the flash device must be provided with a light-adjusting sensor, because the TTL light-adjusting function of that camera body cannot be utilized.

Therefore, if a camera body not having the flash bracketing function is combined with a flash device not having the light-adjusting function, it has been heretofore impossible to perform the flash bracketing photography by utilizing the TTL light-adjusting function of the camera body.

BRIEF SUMMARY OF THE INVENTION

In accordance with an aspect of the invention, there is provided a flash device having a flash bracketing function, in which a control circuit is provided for outputting information on a reference value for exposure-amount correction and an amount of shift for flash bracketing if a camera connected to the flash device is of a type having the flash bracketing function, and for outputting information on a currently-set exposure-amount correction value if a camera connected to the flash device is of a type not having the flash bracketing function, so that appropriate information can be outputted according to whether or not a camera connected to the flash device is of the type having the flash bracketing function.

In accordance with another aspect of the invention, there is provided a flash device, in which a control circuit is provided for outputting, before a flash bracketing photography begins, information on all exposure-amount correction values to be used for the flash bracketing photography, if a camera connected to the flash device is of a type having the flash bracketing function, and for outputting, during every photographing, information on a currently-set exposure-amount correction value if a camera connected to the flash device is of a type not having the flash bracketing function, so that appropriate information can be outputted according to whether or not a camera connected to the flash device is of the type having the flash bracketing function.

These and other aspects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 9(a), 9(b) and 9(c) respectively illustrate waveforms in parts during photography of the first frame, waveforms in parts during photography of the second frame and waveforms in parts during photography of the third frame in the flash bracketing photography in each of the first and second embodiments of the invention.

DETAILED DESCRIPTION OF THE INVENTION

Hereinafter, preferred embodiments of the invention will be described in detail with reference to the drawings.

First Embodiment

Figure 1:
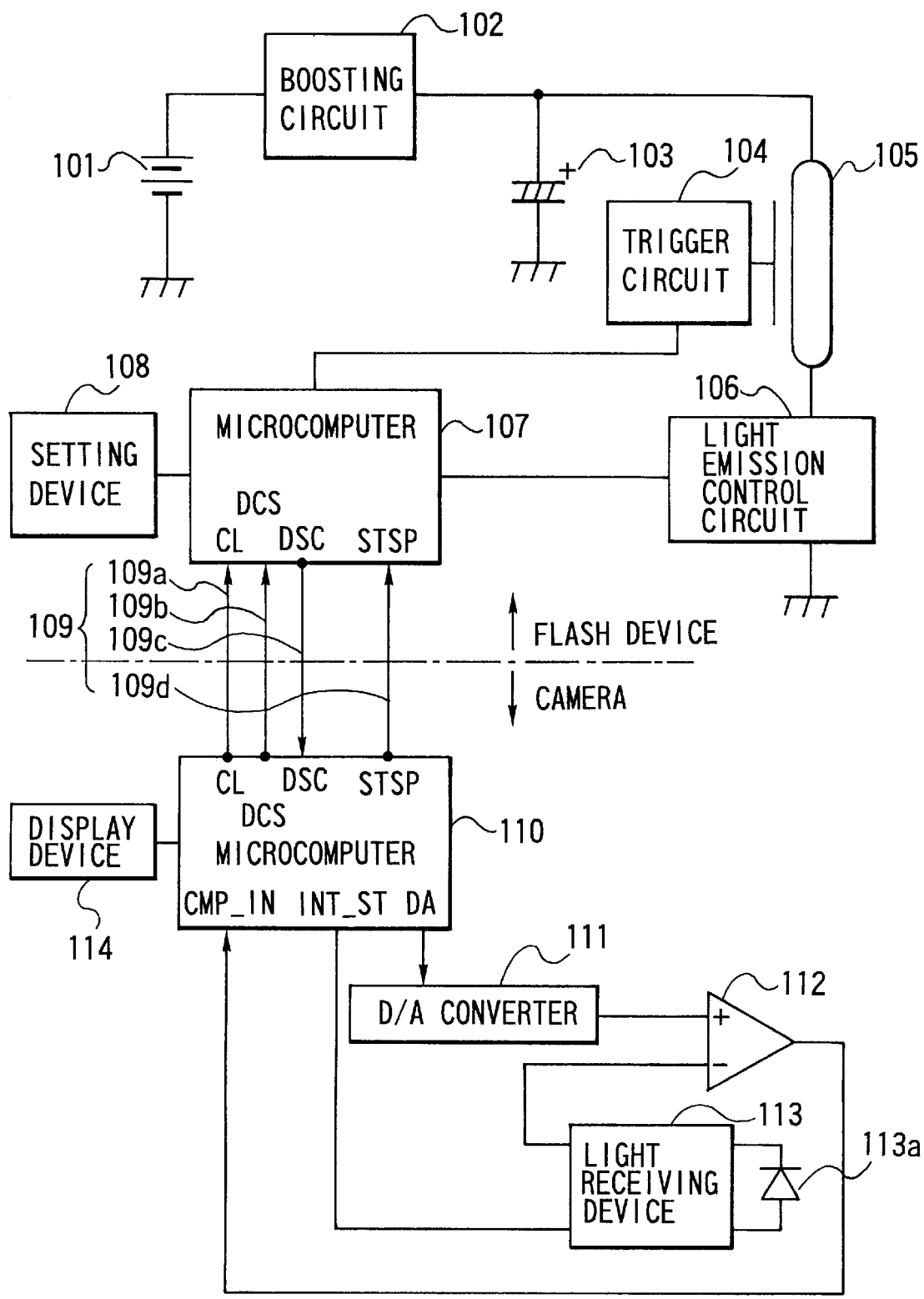
FIG. 1 is an illustration of the construction of a camera system composed of a camera and a flash device according to each of first and second embodiments of the invention.

FIG. 1 is an illustration of the construction of a camera system composed of a camera and a flash device according to a first embodiment of the invention.

Construction of the Flash Device

In FIG. 1, reference numeral 101 represents a battery acting as a power supply, reference numeral 102 designates a boosting circuit for stepping up the voltage of the battery 101, reference numeral 103 denotes a main capacitor for storing the output of the boosting circuit 102, reference numeral 104 depicts a trigger circuit for exciting a discharge tube 105 for light emission, reference numeral 105 signifies the discharge tube for converting an electrical energy of the main capacitor 103 into light, reference numeral 106 indicates a light emission control circuit for controlling the light emission of the discharge tube 105, and reference numeral 107 stands for a microcomputer for the flash device (which will be referred hereinafter to as the flash-device microcomputer) which controls the operation of the flash device, such as the control of light emission, the communication with the camera and the setting of the flash bracketing. Further, reference numeral 108 represents a flash bracketing setting device. Reference numeral 109 designates communication lines for establishing the connection between the camera and the flash device, where reference numeral 109a denotes a clock signal line for receiving the output from the camera, which establishes the connection between terminals CL of the flash-device microcomputer 107 and a camera microcomputer 110, reference numeral 109b depicts a data line from the camera to the flash device, which sets up the connection between terminals DCS of the flash-device microcomputer 107 and the camera microcomputer 110, and reference numeral 109c signifies a data line from the flash device to the camera, which establishes the connection between terminals DSC of the flash-device microcomputer 107 and the camera microcomputer 110. In the communication, data is fed from the camera to the flash device or from the flash device to the camera in synchronism with a clock signal from the camera. Still further, reference numeral 109d shows a line for signals representative of the emission start and stop forwarded from the camera to the flash device, making the connection between terminals STSP of the flash-device microcomputer 107 and the camera microcomputer 110.

When a power switch (not shown) of the flash device turns on, the boosting circuit 102 starts to operate so that the battery voltage is raised up to a high voltage, and is then stored in the main capacitor 103.

Construction of the Camera

Reference numeral 110, as mentioned above, stands for a microcomputer for the camera (which will be referred hereinafter to as the camera microcomputer). Reference numeral 111 signifies a D/A converter for conducting a D/A conversion with an output of the DA terminal of the camera microcomputer 110, and the output of the D/A converter 111 is inputted to the noninverting terminal of a comparator 112. Reference numeral 112 designates the comparator, whose output terminal is connected to an input terminal CMP_IN of the camera microcomputer 110. Reference numeral 113 represents a light receiving device (composed of a light receiving element 113a and an integrating circuit (not shown) for integrating the output of the light receiving element 113a) for receiving and integrating light which has been emitted from the flash device, then reflected on a subject and then reflected on a film surface after passing through a photographing lens (not shown) of the camera. Further, the light receiving device 113 starts the integration in response to a signal from an output terminal INT_ST of the camera microcomputer 110, and the output of the light receiving device 113 is inputted to the inverting terminal of the comparator 112. Reference numeral 114 denotes a display device for conducting a display upon receipt of a signal from the camera microcomputer 110.

The camera microcomputer 110 forwards a clock signal through the communication line 109a to the flash device, and the camera sends data through the communication line 109b to the flash device in synchronism with the clock signal, whereas the flash device gives data through the communication line 109c to the camera. When a command indicative of a request for data is transmitted from the camera to the flash device, the flash device sends the data to the camera.

Setting of the Flash Bracketing

Figure 2:
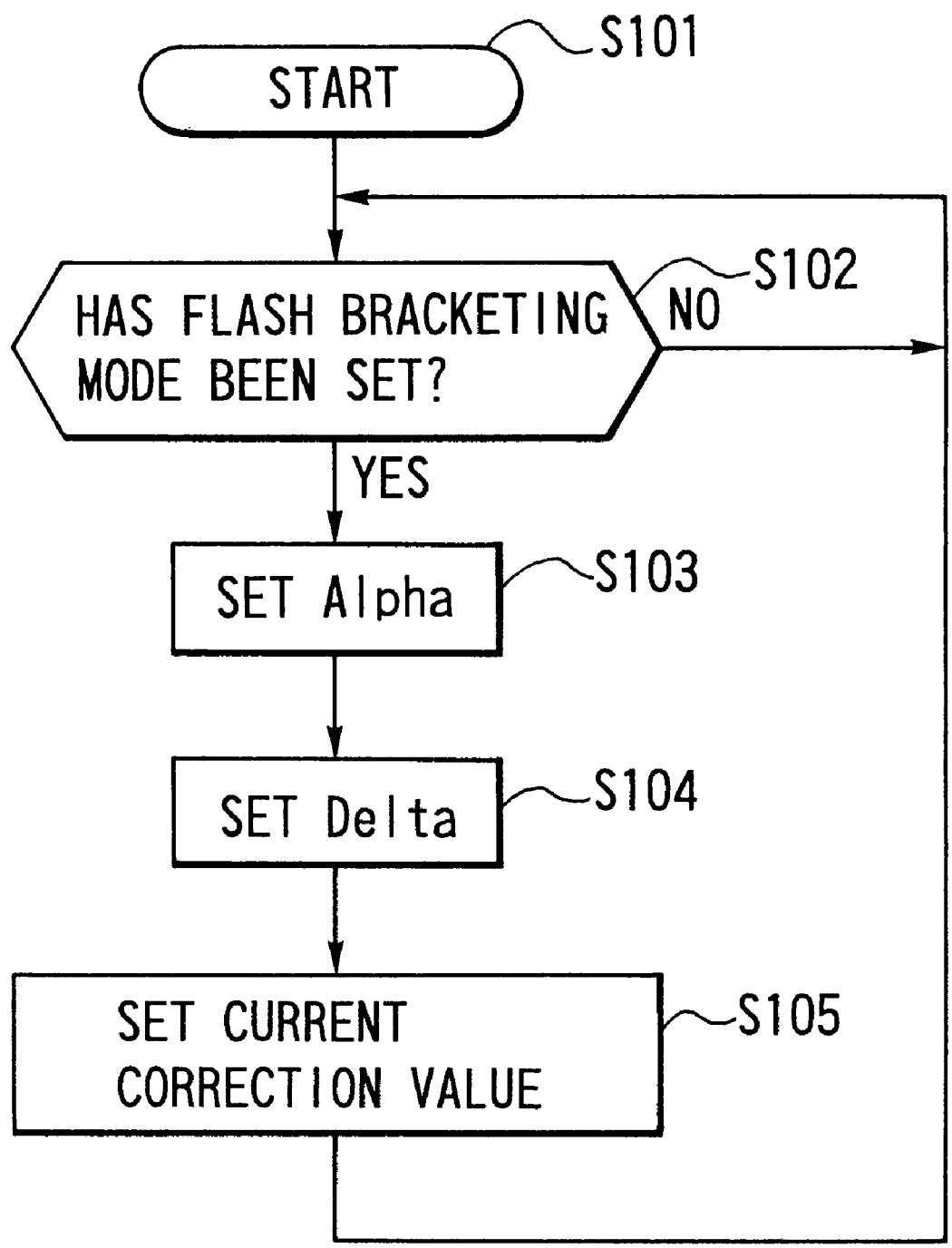
FIG. 2 is a flow chart showing a setting operation for flash bracketing in the flash device according to the first embodiment of the invention.

The setting of the flash bracketing will be described hereinbelow with reference to an operational flow of the flash-device microcomputer 107 in FIG. 2.

The operational flow starts at a step S101, then followed by a step S102 to check whether the flash bracketing mode is set by the setting device 108 or not. If so, the operational flow proceeds to a step S103, and if not, returns to the step S102. The step S103 is for setting, to a communication buffer for communication with the camera, a reference value (Alpha) for exposure-amount correction by flash light in a flash bracketing photography set by the setting device 108, and a step S104 follows to set, to the communication buffer, an amount of shift (Delta) of the flash bracketing photography set by the setting device 108. Thereafter, the operational flow proceeds to a step S105.

In the step S105, a currently-set correction value for an exposure amount by flash light, which is to be transmitted to the camera, is set to the communication buffer. In the flash device, if the flash bracketing mode is set by the setting device 108, a correction value (Alpha−Delta) is set at the first frame of the flash bracketing photography, a correction value (Alpha) is set at the second frame, and a correction value (Alpha+Delta) is set at the third frame. Following this, the operational flow returns to the step S102.

Communication with the Camera

Figure 3:
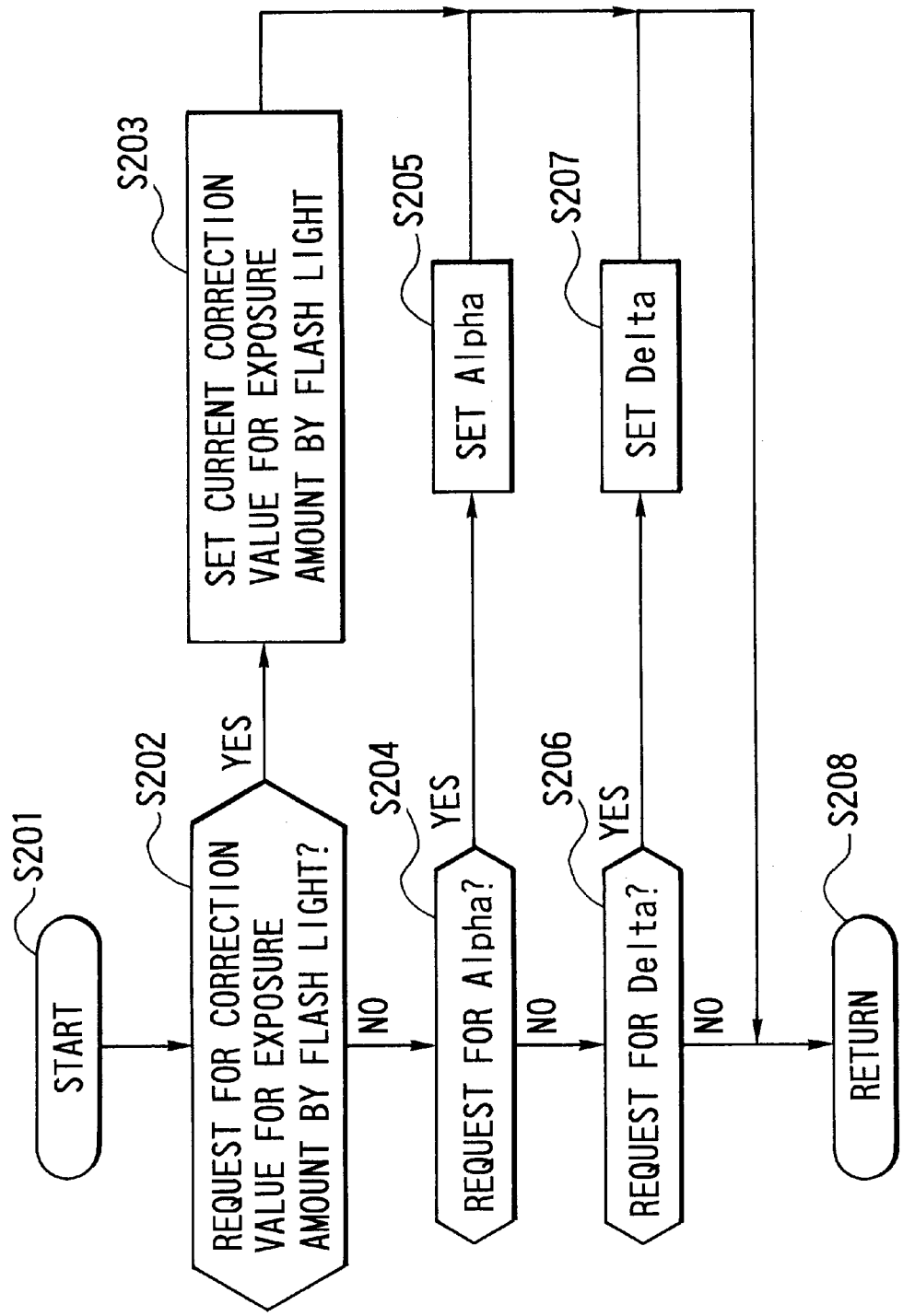
FIG. 3 is a flow chart showing a communication operation in the flash device according to the first embodiment of the invention.

A description will be given hereinbelow of a communication with the camera with reference to the flow of the flash-device microcomputer 107 in FIG. 3.

In the communication, data is transmitted from the camera through the terminal DCS to the flash device in synchronism with the clock signal at the terminal CL of the camera, and the data set in a data buffer of the flash device is transferred from the flash device through the terminal DSC to the camera.

On transmitting a clock signal corresponding to 8 bits, an interruption to the flash-device microcomputer 107 takes place to start a communication interrupt operation (S201). If in a step S202 a communication request from the camera signifies a request for a correction value for an exposure amount by the flash device, the operational flow advances to a step S203, and if not, proceeds to a step S204.

In the step S203, the aforesaid currently-set correction value for an exposure amount by flash light (the correction value "Alpha−Delta" at the first frame of the flash bracketing photography, the correction value "Alpha" at the second frame and the correction value "Alpha+Delta" at the third frame) is set in the data buffer for the next communication from the flash device to the camera, and the operational flow proceeds to a step S208. In the step S204, if the communication from the camera is a request for the reference value (Alpha) for exposure-amount correction by flash light in the flash bracketing photography, which has been set by the flash bracketing setting device 108, the operational flow proceeds to a step S205, and if not, proceeds to a step S206. In the step 205, the reference value (Alpha) for exposure-amount correction by flash light in the flash bracketing photography is set in the data buffer from the next communication from the flash device to the camera, and the operational flow proceeds to the step S208.

In the step S206, if the communication from the camera is a request for the amount of shift of the flash bracketing (Delta), the operational flow advances to a step S207, and if not, proceeds to a step S208. In the step S207, the amount of shift of the flash bracketing (Delta) is set in the data buffer for the next communication from the flash device to the camera, then being followed by the step S208. The interrupt operation terminates at the step S208.

Through the above-described operation, the current correction value for an exposure amount by flash light, the reference value (Alpha) for exposure-amount correction by flash light in the flash bracketing photography, and the amount of shift of the flash bracketing (Delta) are communicated from the flash device to the camera.

Operation of a Camera Not Having the Flash Bracketing Function

Referring to the flow of FIG. 4, a description will be taken hereinbelow of an operation of a camera not having the flash bracketing function. This camera has a program incorporated therein to make the camera microcomputer 110 execute the flow of FIG. 4.

Figure 8A:
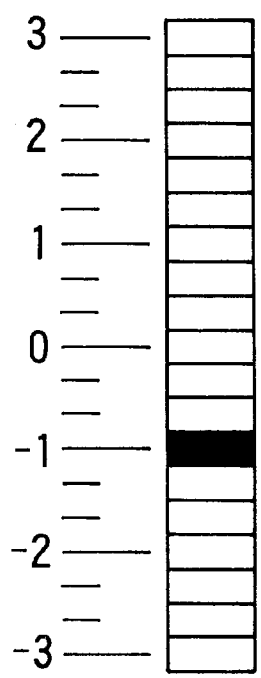
FIGS. 8(a), 8(b) and 8(c) respectively illustrate the display of the first frame, the display of the second frame and the display of the third frame in the flash bracketing photography in the camera not having the flash bracketing function in the first embodiment of the invention.
Figure 8B:
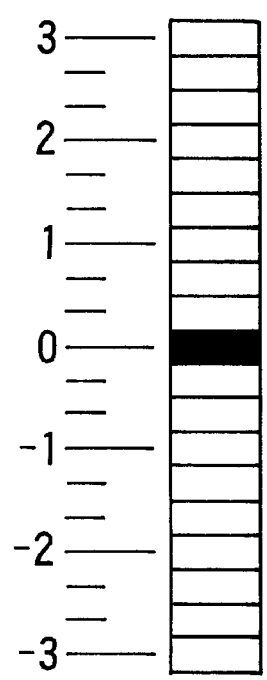
Figure 8C:
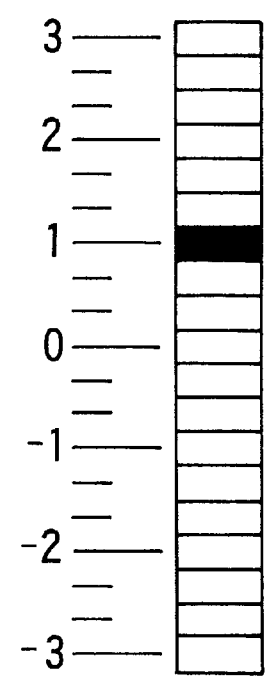

The operational flow begins at a step S301, and subsequently a step S302 is executed to make a communication of a command on a request for the current correction value for an exposure amount by flash light, set in the flash device, from the camera to the flash device. Whereupon, the flash device transmits, to the camera, the current correction value for an exposure amount set in the step S203 of FIG. 3, at every one-frame photographing. The camera receives, from the flash device, the correction value for an exposure amount by flash light, thereafter proceeding to a step S303. In the step S303, the display of the received correction value for an exposure amount by flash light takes place, and the operational flow then returns to the step S302. FIG. 8(a) shows the display obtained when the correction value for an exposure amount by flash light assumes −1 step, where a dot corresponding to "−1" lights up.

Operation of a Camera Having the Flash Bracketing Function

Figure 7:
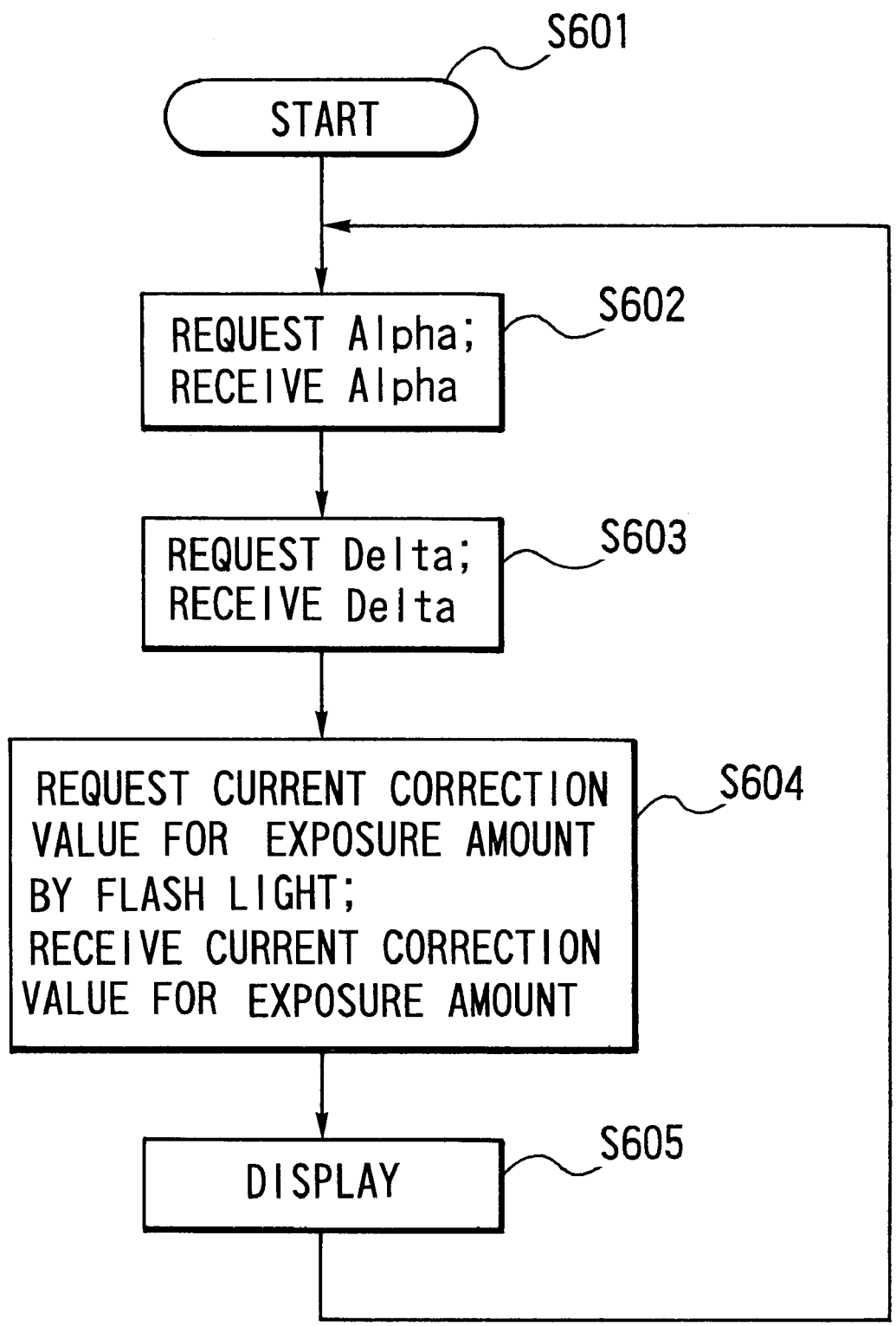
FIG. 7 is a flow chart showing an operation of a camera having the flash bracketing function in the first embodiment of the invention.

Referring to the flow of FIG. 7, a description will be made hereinbelow of an operation of a camera having the flash bracketing function. This camera has a program incorporated therein for making the camera microcomputer 110 execute the flow of FIG. 7.

After the start at a step S601, a step S602 follows to send a command on a request for the reference value (Alpha) for exposure-amount correction by flash light in the flash bracketing photography, set by the flash bracketing setting device 108, from the camera to the flash device. In the step S205 of FIG. 3, the flash device transmits, to the camera, the reference value (Alpha) for exposure-amount correction by flash light in the flash bracketing photography. The operational flow proceeds to a step S603 after the reception of this reference value by the camera.

In the step S603, the camera transmits, to the flash device, a command on a request for the amount of shift of the flash bracketing (Delta), and then receives the amount of shift of the flash bracketing (Delta) from the flash device. Thereafter, the operational flow advances to a step S604. In the step S604, a request command for the current correction value for an exposure amount by flash light set in the flash device is communicated from the camera to the flash device, and through a communication operation similar to the case for the reference value in the step S602, the camera receives the current correction value for an exposure amount by flash light from the flash device. Subsequently, the operational flow advances to a step S605. In the step S605, the flash bracketing display takes place on the basis of the received reference value (Alpha) for exposure-amount correction by flash light in the flash bracketing photography, the amount of shift of the flash bracketing (Delta) and the current correction value for an exposure amount by flash light. Then, the operational flow returns to the step S602.

Figures 10A, 10B, 10C:
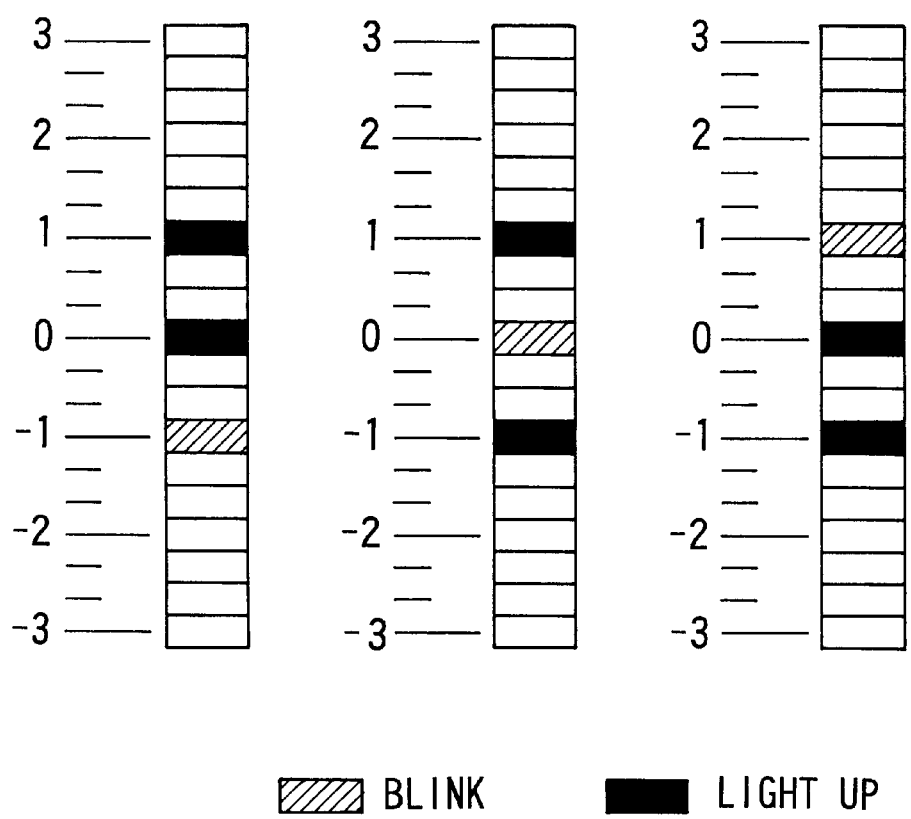
FIGS. 10(a), 10(b) and 10(c) respectively illustrate the display of the first frame, the display of the second frame and the display of the third frame in the flash bracketing photography in the camera having the flash bracketing function in the first embodiment of the invention.

FIG. 10(b) shows the display in a case where "the reference value (Alpha) for exposure-amount correction by flash light in the flash bracketing photography"=0, "the amount of shift of the flash bracketing (Delta)"=1 step, and "the current correction value for an exposure amount by flash light"=0.

In this case, the amount of exposure by flash light in the flash bracketing photography assumes −1 step, 0 step (adequate amount of light) and +1 step, and the display is performed such that the dots corresponding to "−1" and "+1" light up, whereas the dot corresponding to "0" blinks.

Taking the first frame at (Alpha−Delta), the second frame at (Alpha) and the third frame at (Alpha+Delta) for instance, in the case of conducting the flash bracketing photography, the display varies whenever photographing one frame, as shown in FIGS. 10(a), 10(b) and 10(c).

Operation of the Camera during Light Emission

There is no difference in camera operation during light emission between a camera not having the flash bracketing function and a camera having the flash bracketing function.

When a release button (not shown) of the camera is depressed, the camera microcomputer 110 starts an interrupt operation for light emission of the flash device. A description will be taken hereinbelow of the camera operation with reference to the flow of FIG. 5.

The interrupt begins with a step S401, then followed by a step S402, where a value corresponding to the correction value for an exposure amount by flash light, received from the flash device, is outputted to the D/A converter 111, which in turn, outputs the set voltage to the noninverting input of the comparator 112 (in this instance, since the camera microcomputer 110 has not yet fed an integration start signal to the light receiving device 113, the output of the light receiving device 113 is smaller than the D/A output, so that the output of the comparator 112 is at a high level). Meanwhile, when the camera shutter goes from a closed state to a full-open state, a synchro-flash switch turns on, and the operational flow proceeds to a step S403 (before time T1 in FIGS. 9(a), 9(b) and 9(c)). In the step S403, the camera microcomputer 110 switches the communication line 109d from "High" to "Low" to communicate a light emission start signal to the flash device, and subsequently, the operational flow advances to a step S404 (at time T1 in FIGS. 9(a), 9(b) and 9(c)).

In the step S404, the output terminal INT_ST of the camera microcomputer 110 is switched from "Low" to "High", so that the light receiving device 113 starts the integration, thereafter followed by a step S405. In response to the light emission start signal, the flash device starts the light emission, and if the integrated value obtained by the light receiving device 113 exceeds the output of the D/A converter 111, the output of the comparator 112 is inverted to switch from "High" to "Low". In the step S405, if the input terminal CMP_IN of the camera microcomputer 110 is in the "Low" state, the operational flow proceeds to a step S406, and if "High", the operational flow returns to the step S405. In the step S406, the terminal STSP of the camera microcomputer 110 is switched from "Low" to "High", and a light emission stop signal is outputted to the flash device, then followed by a step S407 (at time T2 in FIGS. 9(a), 9(b) and 9(c)). The interrupt operation terminates in the step S407.

Light Emission Operation of the Flash Device

A light emission operation of the flash device will be described hereinbelow with reference to the flow of FIG. 6.

When the line 109d for the light emission start and stop signals from the camera is switched from "High" to "Low", the flash-device microcomputer 107 enters an interruption routine for the light emission.

The interruption routine starts at a step S501, and a step S502 follows to output a light emission start signal to the trigger circuit 104 and to the light emission control circuit 106. The light emission control circuit 106 turns on to establish a discharge loop of "the anode of the main capacitor 103—the discharge tube 105—the light emission control circuit 106—the cathode of the main capacitor 103". Further, the trigger circuit 104 applies a high voltage to the discharge tube 105 to energize the discharge tube 105. Whereupon, the energy charged in the main capacitor 103 starts discharge through the discharge loop of "the anode of the main capacitor 103—the discharge tube 105—the light emission control circuit 106—the cathode of the main capacitor 103", so that the light emission begins.

If in a step S503 the communication line 109d is switched from "Low" to "High" (when the light emission stop signal is received from the camera), the operational flow proceeds to a step S504, and if not, returns to the step S503. In the step S504, the flash-device microcomputer 107 outputs the light emission stop signal to the light emission control circuit 106, and hence, the light emission control circuit 106 goes into the turning-off state to cut off the discharge loop of "the anode of the main capacitor 103—the discharge tube 105—the light emission control circuit 106—the cathode of the main capacitor 103", thereby stopping the light emission.

After the termination of the light emission, a check is made as to whether the flash bracketing mode is set or not (S505). If so, the operational flow proceeds to a step S506, and if not, proceeds to a step S507. In the step S506, the correction value for an exposure amount by flash light, to be transmitted to the camera, is reset in accordance with the number of times of photography in the flash bracketing mode.

For instance, in the case of performing the flash bracketing photography such as the first frame at (Alpha−Delta), the second frame at (Alpha) and the third frame at (Alpha+Delta), if the next photography is the second frame after the completion of the first frame photography, the correction value (Alpha) for an exposure amount by flash light for the second frame is set. Thus, when the exposure amount by flash light is changed as mentioned above, the output to the D/A converter 111 of the camera microcomputer 110 varies in accordance with the correction value as indicated by 901a, 901b and 901c in FIGS. 9(a), 9(b) and 9(c), so that the amount of light emission of the flash device also varies as indicated by 907a, 907b and 907c in FIGS. 9(a), 9(b) and 9(c). With the above-mentioned operation, the flash bracketing photography becomes feasible.

Furthermore, it is acceptable that the flash bracketing photography is removed after the completion of the third frame photography or is restarted from the correction value for an exposure amount by flash light for the first frame after the completion of the third frame photography. In addition, any order of the flash bracketing photography, such as the first frame at (Alpha), the second frame at (Alpha−Delta) and the third frame at (Alpha+Delta) or the first frame at (Alpha+Delta), the second frame at (Alpha) and the third frame at (Alpha−Delta), is acceptable.

Second Embodiment

FIG. 1 and FIG. 11 to FIGS. 14(a), 14(b) and 14(c) are illustrations for explaining a second embodiment of the invention. The same parts as those in the first embodiment will be omitted from the following description, and the following description will be limited to only the different parts.

Set values for the flash bracketing to be communicated to the camera are all the correction values for an exposure amount by flash light to be corrected during the flash bracketing photography.

Setting of the Flash Bracketing

Figure 11:
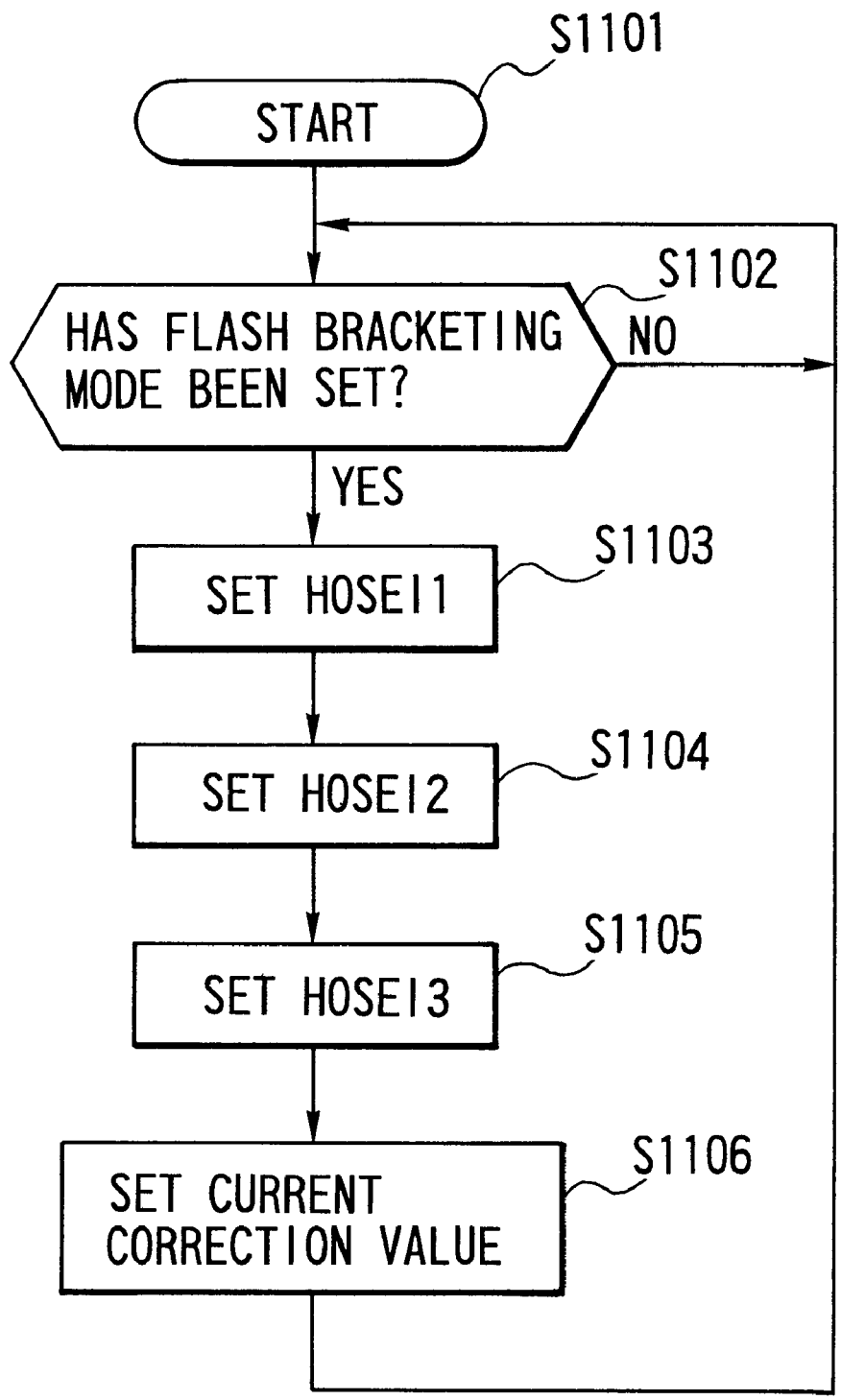
FIG. 11 is a flow chart showing a setting operation for flash bracketing in a flash device according to the second embodiment of the invention.

Referring to the flow of the flash-device microcomputer 107 in FIG. 11, a description will be given hereinbelow of the setting of the flash bracketing in the second embodiment.

The operational flow starts with a step S1101. If in a step S1102 the flash bracketing mode is set by the setting device 108, the operational flow proceeds to a step S1103, and if not, returns to the step S1102. In steps S1103 to S1105, all the correction values HOSEI1, HOSEI2 and HOSEI3 for an exposure amount by flash light, set by the setting device 108 to be communicated to the camera for correction during the flash bracketing photography, are set in the communication buffer for the communication to the camera before the start of a series of flash bracketing photography, and the operational flow advances to a step S1106. For instance, if the correction for an exposure amount by flash light with one step in amount of shifting is performed at every one-frame photographing, centering on −1 step, the correction values are taken as HOSEI1=−2 step, HOSEI2=−1 step and HOSEI3=0 step (adequate exposure amount).

In the step S1106, the current correction value for an exposure amount by flash light, to be transmitted to the camera, is set in the communication buffer. If the current correction value is for the first frame, HOSEI1 is set, and if for the second frame, HOSEI2 is set, and if for the third frame, HOSEI3 is set. Thereafter, the operational flow returns to the step S1102.

Communication with the Camera

Figure 12:
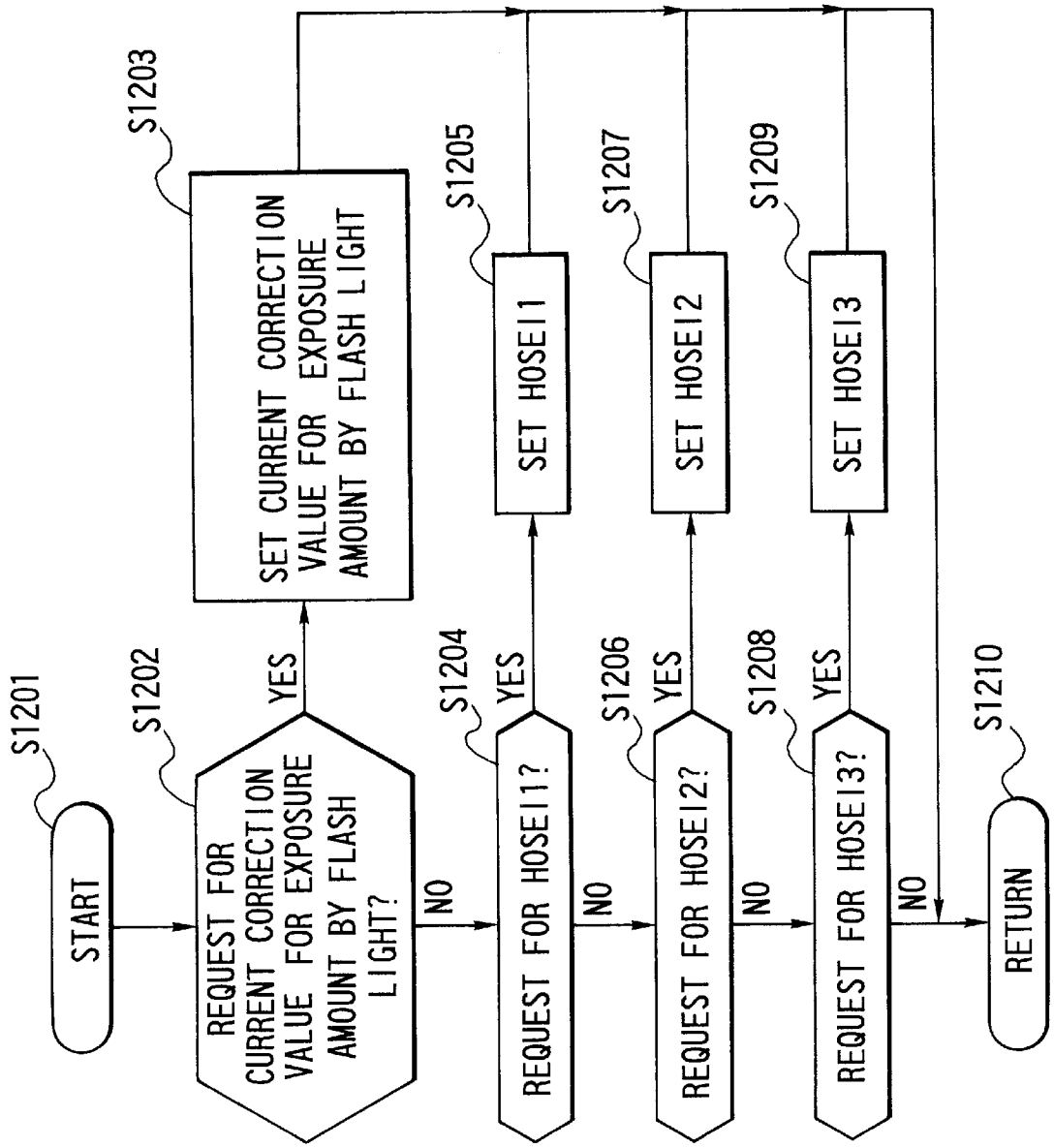
FIG. 12 is a flow chart showing a communication operation in the flash device according to the second embodiment of the invention.

The communication with the camera will be described hereinbelow with reference to the flow of the flash-device microcomputer 107 in FIG. 12. In the communication, data is transmitted from the camera through the terminal DCS to the flash device in synchronism with the clock signal at the terminal CL of the camera, and the data buffer data of the flash device set in the data buffer of the flash device is transferred from the flash device through the terminal DSC to the camera in synchronism with the clock signal at the terminal CL of the camera.

If the clock signal corresponding to 8 bits is transmitted, an interruption takes place in the flash-device microcomputer 107, so that an interrupt operation for the communication starts (S1201). If in a step S1202 the communication from the camera is concerned with a request for the currently-set correction value for an exposure amount by flash light, the operational flow proceeds to a step S1203, and if not, advances to a step S1204.

In the step S1203, the currently-set correction value for an exposure amount by flash light is set in the data buffer for the next communication from the flash device to the camera, then followed by a step S1210.

In the step S1204, if the communication from the camera relates to a request for the correction value (HOSEI1) for an exposure amount by flash light for the first-frame flash bracketing photography which is set by the flash bracketing setting device 108, the operational flow proceeds to a step S1205, and if not, proceeds to a step S1206. In the step S1205, the correction value (HOSEI1) for an exposure amount by flash light for the first-frame flash bracketing photography is set in the data buffer for the next communication from the flash device to the camera, and then, the step S1205 is followed by the step S1210.

In the step S1206, if the communication from the camera relates to a request for the correction value (HOSEI2) for an exposure amount by flash light for the second-frame flash bracketing photography which is set by the flash bracketing setting device 108, the operational flow advances to a step S1207, and if not, proceeds to a step S1208. In the step S1207, the correction value (HOSEI2) for an exposure amount by flash light for the second-frame flash bracketing photography is set in the data buffer for the next communication from the flash device to the camera, and subsequently, the operational flow proceeds to the step S1210.

In the step S1208, if the communication from the camera relates to a request for the correction value (HOSEI3) for an exposure amount by flash light for the third-frame flash bracketing photography which is set by the flash bracketing setting device 108, the operational flow advances to a step S1209, and if not, proceeds to the step S1210. In the step S1209, the correction value (HOSEI3) for an exposure amount by flash light for the third-frame flash bracketing photography is set in the data buffer for the next communication from the flash device to the camera, and subsequently, the operational flow proceeds to the step S1210. The interrupt operation terminates in the step S1210.

Through the above-described processing, the currently-set correction value for an exposure amount by flash light and the set exposure amounts by flash light corresponding to three frames in the flash bracketing photography are sent from the flash device to the camera.

Construction of the Camera

The construction of the camera in the second embodiment is the same as that of the first embodiment shown in FIG. 1.

Figure 4:
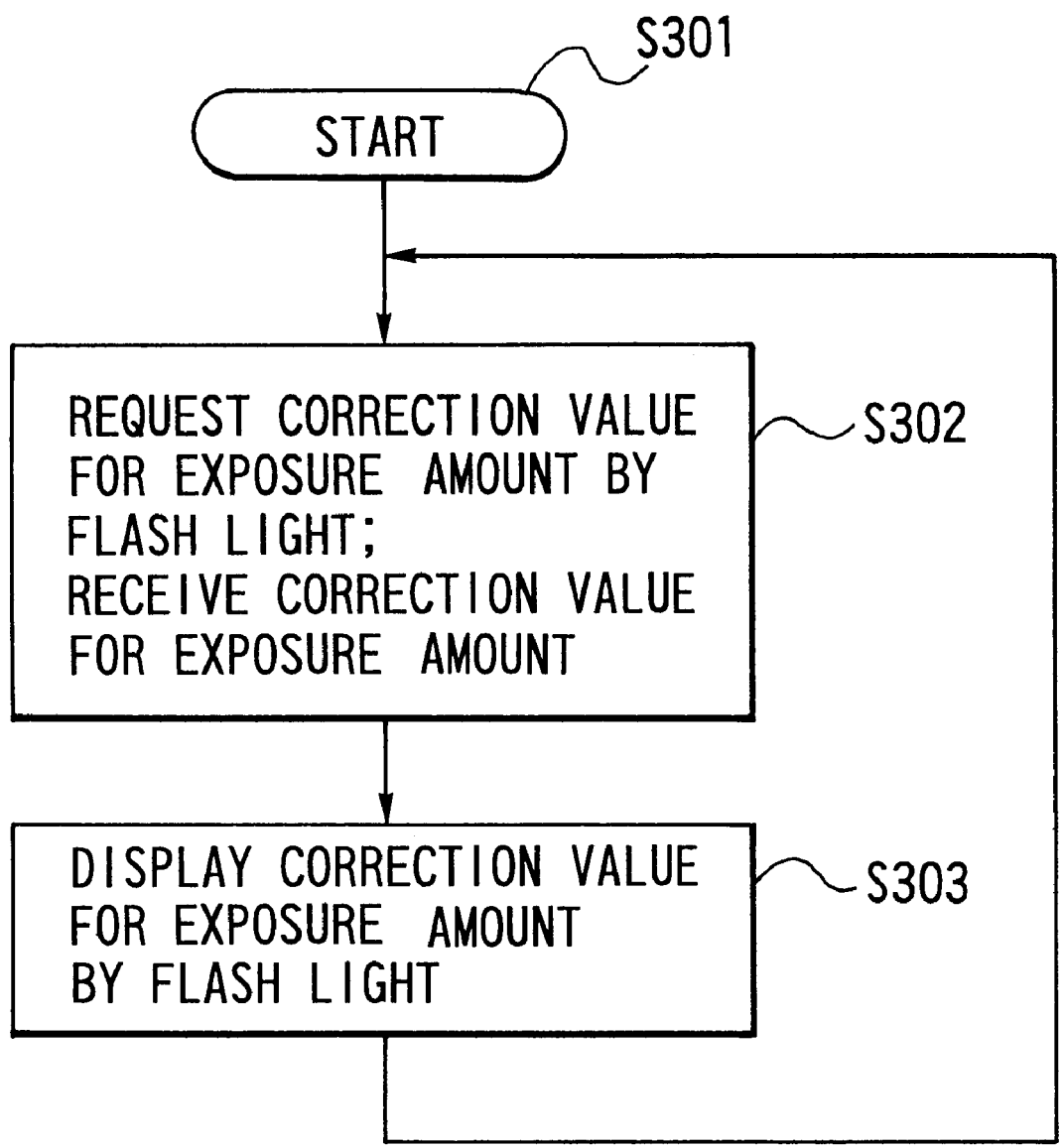
FIG. 4 is a flow chart showing an operation of a camera not having the flash bracketing function in each of the first and second embodiments of the invention.

The manner of the communication between the camera microcomputer 110 and the flash-device microcomputer 107 is the same as in the flow chart of FIG. 4.

Operation of a Camera Not Having the Flash Bracketing Function

The operation of a camera not having the flash bracketing function is the same as in the flow chart of FIG. 4, and the camera receives the correction values for an exposure amount by flash light from the flash device through communications, and displays them.

Operation of a Camera Having the Flash Bracketing Function

Figure 13:
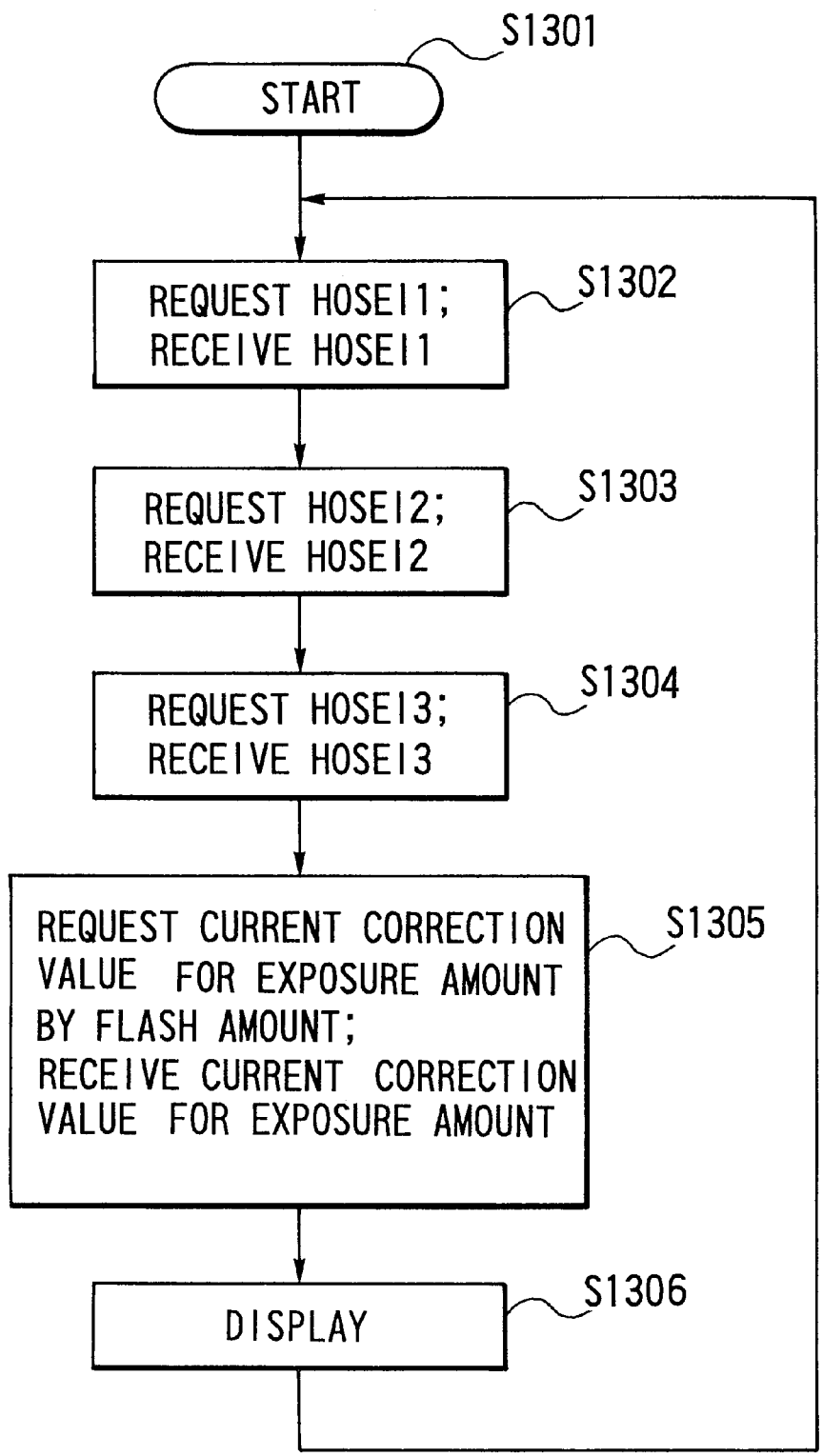
FIG. 13 is a flow chart showing an operation of a camera having the flash bracketing function in the second embodiment of the invention.
Figure 14A:
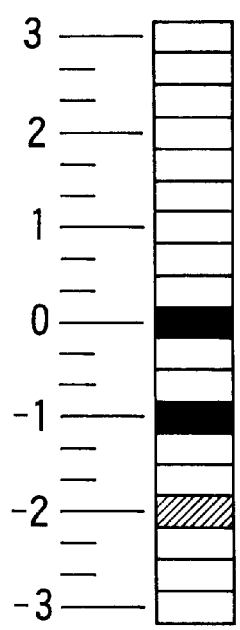
FIGS. 14(a), 14(b) and 14(c) respectively illustrate the display of the first frame, the display of the second frame and the display of the third frame in the flash bracketing photography in the camera having the flash bracketing function in the second embodiment of the invention.
Figure 14B:
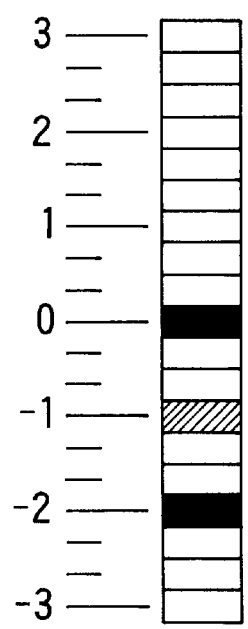
Figure 14C:
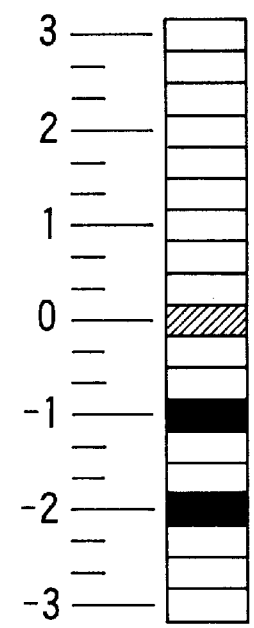

Referring to the flow chart of FIG. 13, a description will be made hereinbelow of an operation of a camera having the flash bracketing function.

The operation starts with a step S1301, and a step S1302 follows to transmit a command on a request for the correction value (HOSEI1) for an exposure amount by flash light for the first-frame flash bracketing photography, set by the flash bracketing setting device 108, from the camera to the flash device, and to receive the correction value (HOSEI1) for an exposure amount by flash light in the flash bracketing photography from the flash device, and the operational flow proceeds to a step S1303.

In the step S1303, the camera transmits the request command for the correction value (HOSEI2) for an exposure amount by flash light for the second-frame flash bracketing photography, set by the flash bracketing setting device 108, to the flash device, and receives the correction value (HOSEI2) for an exposure amount by flash light in the flash bracketing photography from the flash device, and thereafter, the operational flow advances to a step S1304.

In the step S1304, the camera transmits the request command for the correction value (HOSEI3) for an exposure amount by flash light for the third-frame flash bracketing photography, set by the flash bracketing setting device 108, to the flash device, and receives the correction value (HOSEI3) for an exposure amount by flash light in the flash bracketing photography from the flash device, and thereafter, the operational flow advances to a step S1305.

In the step S1305, the camera transmits the request command for the currently-set correction value for an exposure amount by flash light, set in the flash device, to the flash device, and receives the correction value for an exposure amount by flash light from the flash device. Then, the operational flow proceeds to a step S1306.

In the step S1306, the flash bracketing display is performed on the basis of the received correction values (HOSEI1, HOSEI2, HOSEI3) for an exposure amount by flash light for the first, second and third frames in the flash bracketing photography and the currently-set correction value for an exposure amount by flash light, and then, the operational flow returns to the step S1302.

FIGS. 14(*a*), 14(*b*) and 14(*c*) show the displays obtained when the amount of shift of the flash bracketing is set to 1 step with the exposure-amount correction by flash light in the flash bracketing photography centered on −1 step, that is, in the case of the first frame at (HOSEI1)=−2 step, the second frame at (HOSEI2)=−1 step and the third frame at (HOSEI3)=0 step (adequate exposure amount). At the flash bracketing photography, the display varies as shown in FIGS. 14(*a*), 14(*b*) and 14(*c*) whenever one-frame photography is performed.

Although in the second embodiment the flash bracketing photography is performed for three frames, it is also possible to take the number other than three frames. In this case, for its realization, the set correction values for the number of frames are communicated from the flash device to the camera.

Operation of the Camera during Light Emission

Figure 5:
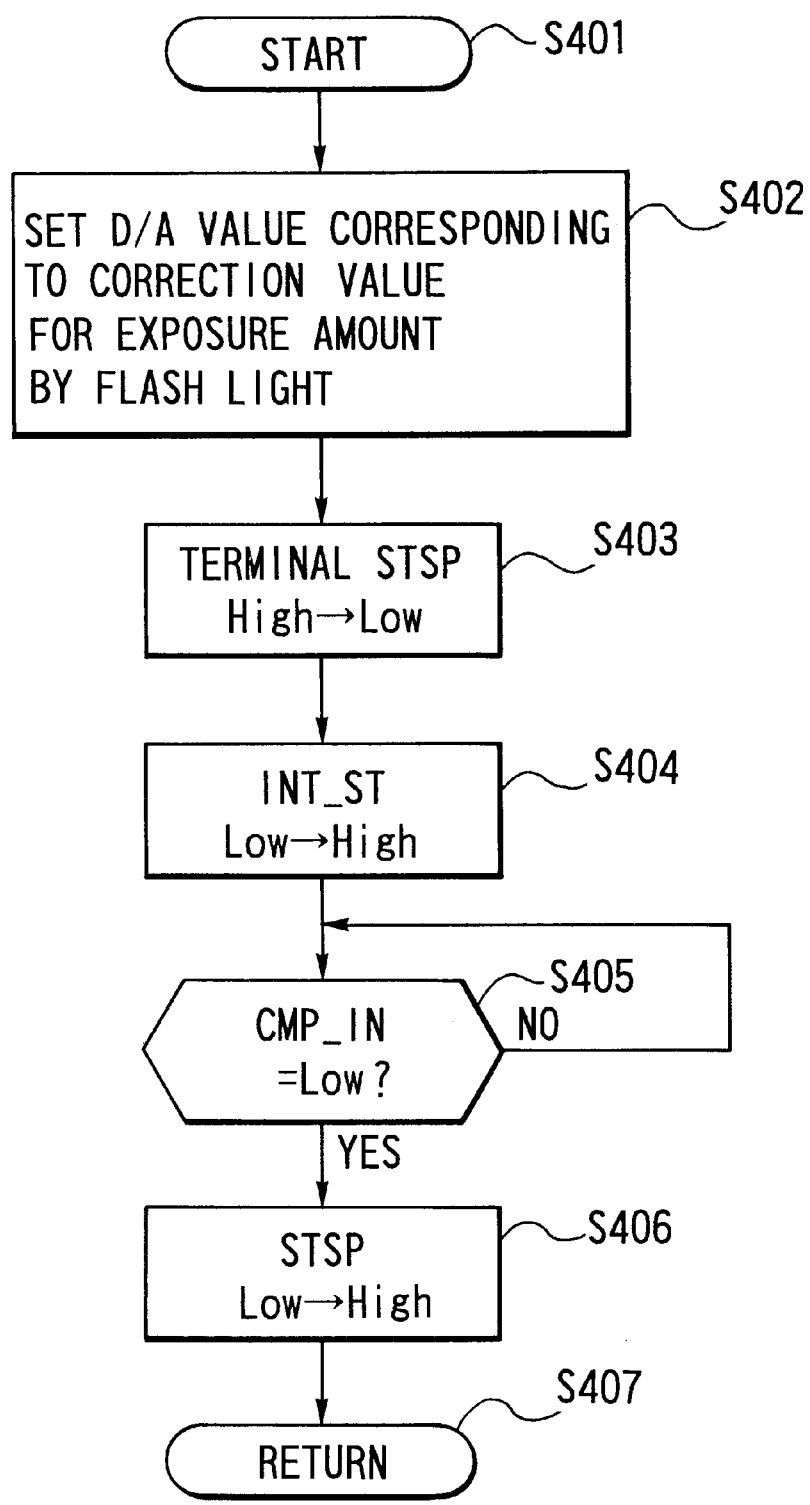
FIG. 5 is a flow chart showing an interrupt operation to be performed during a camera release in each of the first and second embodiments of the invention.

The operation of the camera during the light emission is the same as in the flow of FIG. 5.

Light Emission Operation of the Flash Device

Figure 6:
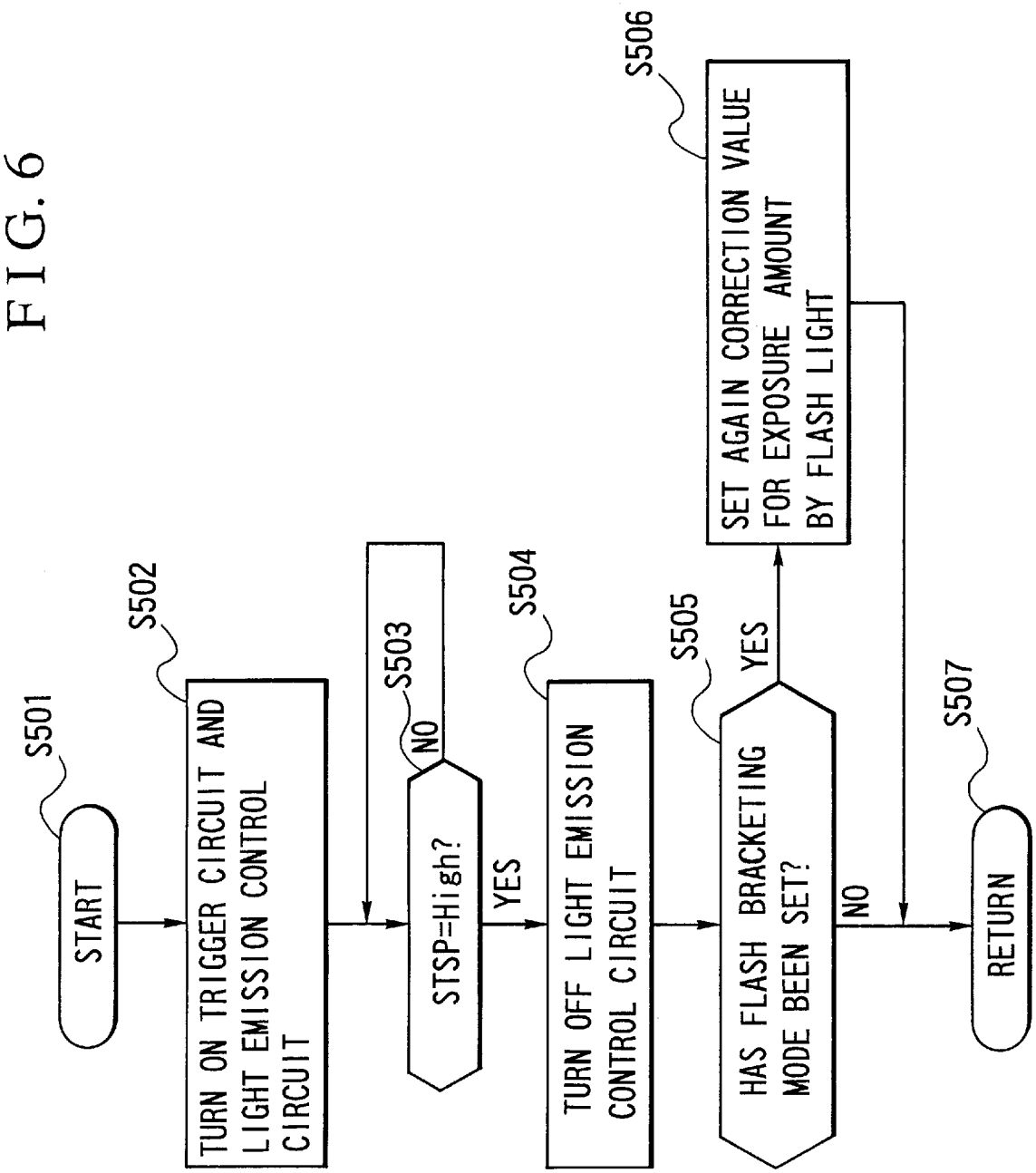
FIG. 6 is a flow chart showing an interrupt operation to be performed at the time of light emission of the flash device in each of the first and second embodiments of the invention.

The light emission operation of the flash device is the same as in the flow of FIG. 6. However, in the step S506, for the resetting of the correction value for an exposure amount by flash light to be transmitted to the camera, it is also possible to employ a method in which HOSEI2 is taken after the first-frame photography is completed, HOSEI3 is taken after the second-frame photography is finished, and after the third-frame photography, the flash bracketing photography is removed similarly to the first embodiment, or a method in which, after the completion of the photography of three frames, the flash bracketing photography is restarted from the correction value for an exposure amount by flash light for the first frame is again taken. In addition, any order of the flash bracketing photography is acceptable.

I claim:

1. A flash device having a flash bracketing function, comprising:

a) a setting device for setting a flash bracketing operation; and b) a control circuit for, when a camera connected to said flash device is of a type having the flash bracketing function, outputting information on a reference value for exposure-amount correction and an amount of shift for flash bracketing, and for, when a camera connected to said flash device is of a type not having the flash bracketing function, outputting information on a currently-set exposure-amount correction value.

2. A flash device having a flash bracketing function, comprising:

a) a setting device for setting a flash bracketing operation; and b) a control circuit for, when a camera connected to said flash device is of a type having the flash bracketing function, outputting information on all exposure-amount correction values to be used during the flash bracketing operation before a flash bracketing photography begins, and for, when a camera connected to said flash device is of a type not having the flash bracketing function, outputting information on a currently-set exposure-amount correction value during every photography.

3. A camera system composed of a flash device having a flash bracketing function and a camera body having the flash bracketing function, said camera system comprising:

a) a flash-device control circuit for outputting information on a reference value for exposure-amount correction and an amount of shift for flash bracketing; and b) a camera control circuit for, responsive to an output of said flash-device control circuit, controlling a display device provided at said camera body, wherein said camera control circuit controls said display device so as to simultaneously display information on the reference value for exposure-amount correction and the amount of shift for flash bracketing.

4. A camera system according to claim 3, wherein said camera control circuit controls said display device so as to simultaneously display a value obtained by subtracting the amount of shift for flash bracketing from the reference value for exposure-amount correction, the reference value for exposure-amount correction, and a value obtained by adding the amount of shift for flash bracketing to the reference value for exposure-amount correction.

5. A camera system according to claim 4, wherein said camera control circuit causes said display device to display in a blinking manner a currently-set exposure-amount correction value during a flash bracketing operation.

6. A camera system composed of a flash device having a flash bracketing function and a camera body having the flash bracketing function, said camera system comprising:

a) a flash-device control circuit for outputting information on all exposure-amount correction values to be used during a flash bracketing operation before a flash bracketing photography begins; and b) a camera control circuit for, responsive to an output of said flash-device control circuit, controlling a display device provided at said camera body, wherein said camera control circuit controls said display device so as to simultaneously display information on the all exposure-amount correction values to be used during the flash bracketing operation.

7. A camera system according to claim 6, wherein said camera control circuit causes said display device to display a currently-set exposure-amount correction value of the all exposure-amount correction values to be used during the flash bracketing operation, in a display manner different from that of the other exposure-amount correction values.

8. A camera system according to claim 7, wherein said camera control circuit causes said display device to display a currently-set exposure-amount correction value of the all exposure-amount correction values to be used during the flash bracketing operation, in a blinking manner and to display the other exposure-amount correction values in a lighting-up manner.

9. A camera having a flash bracketing function, comprising:

a) a display device; and b) a control circuit for controlling said display device, wherein said control circuit requests, to a flash device connected to said camera, information on a reference value for exposure-amount correction and an amount of shift for flash bracketing, and controls said display device so as to simultaneously display information on the reference value for exposure-amount correction and the amount of shift for flash bracketing on the basis of an output of said flash device.

10. A camera according to claim 9, wherein said control circuit controls said display device so as to simultaneously display a value obtained by subtracting the amount of shift for flash bracketing from the reference value for exposure-amount correction, the reference value for exposure-amount correction, and a value obtained by adding the amount of shift for flash bracketing to the reference value for exposure-amount correction.

11. A camera according to claim 10, wherein said control circuit causes said display device to display in a blinking manner a currently-set exposure-amount correction value during a flash bracketing operation.

12. A camera having a flash bracketing function, comprising:

(a) a display device; and b) a control circuit for controlling said display device, wherein said control circuit requests, to a flash device connected to said camera, information on all exposure-amount correction values to be used during a flash bracketing operation before a flash bracketing photography begins, and controls said display device so as to simultaneously display information on the exposure-amount correction values to be used during the flash bracketing operation on the basis of an output of said flash device.

13. A camera according to claim 12, wherein said control circuit causes said display device to display a currently-set exposure-amount correction value of the all exposure-amount correction values to be used during the flash bracketing operation, in a display manner different from that of the other exposure-amount correction values.

14. A camera according to claim 13, wherein said control circuit causes said display device to display a currently-set exposure-amount correction value of the all exposure-amount correction values to be used during the flash bracketing operation, in a blinking manner and to display the other exposure-amount correction values in a lighting-up manner.

* * * * *